United States Patent [19]

Wason

[11] 4,433,332
[45] Feb. 21, 1984

[54] APPARATUS FOR REMOTELY DETERMINING THE POSITION OF ROTATING OBJECTS

[75] Inventor: Thomas D. Wason, Raleigh, N.C.
[73] Assignee: Cain Encoder Co., Greenville, N.C.
[21] Appl. No.: 209,878
[22] Filed: Nov. 24, 1980
[51] Int. Cl.³ .............................................. G08C 19/10
[52] U.S. Cl. .......................... 340/870.37; 340/870.02; 340/870.07
[58] Field of Search .............. 340/870.37; 340/870.07, 340/870.02; 324/61 R

[56] References Cited

U.S. PATENT DOCUMENTS 4,007,454  2/1977  Cain et al. ...................... 340/870.37

Primary Examiner—James J. Groody

[57] ABSTRACT

An electric field is generated in the vicinity of a rotating member to be monitored. The electric field is so constructed as to include a resultant vector representing maximum field strength rotating in a path parallel to the circumferential path of the rotating member. A sensing or reading device is positioned at the rotational axis of the resultant vector for detecting variations in the field strength therein as the vector passes the rotating member. The sensing device creates a periodic electrical output whose relative phase is responsive to and indicative of the angular orientation of the rotating member. The electric field with the rotating resultant vector is formed by generating a polyphase voltage having a plurality of signals, each signal separated from the others by a prescribed phase angle, and wherein each signal is shaped as a square wave. Each of the signals is applied to one of a plurality of exciting electrodes which are arranged in a circular array around a center point aligned with the axis of rotation of the resultant vector. Successive electrodes in the arrangement are connected to successive signals of the polyphase voltage.

2 Claims, 3 Drawing Figures

APPARATUS FOR REMOTELY DETERMINING THE POSITION OF ROTATING OBJECTS

BACKGROUND OF THE INVENTION

In an earlier U.S. Pat. No. 4,007,454, issued to Charles Cain et al, there is disclosed the technique for generating and using what is referred to as a "rotating electric field" in a device for remotely measuring the orientation of a meter hand or other rotating object. Further testing and analysis has shown that the theory of operation of the invention of the aforementioned Cain et al patent is clarified by considering that the portion of the field which is generated in the space adjacent the meter hand or other rotating object to be monitored is such that the resultant vector representing maximum strength of the electric field rotates, by which means the effect of a "rotating electric field" is approximated or approached.

In the Cain et al apparatus mentioned hereinabove there is described a circular array of electrodes with a detecting electrode located at the center of and coplanar with the array. By applying the successive phases of a polyphase voltage to successive electrodes in the circular array, the maximum field strength vector is thus caused to effectively rotate in the adjacent space to accomplish this rotating effect of the maximum field strength vector. Diametrically opposite pairs of the aforementioned electrodes are connected to successive phases of a polyphase voltage source in such a manner as to produce the rotating effect of the maximum field strength vector.

Various changes and modifications have been made to this basic invention as disclosed in U.S. Pat. No. 4,007,454. For example, one such change is disclosed in U.S. patent application Ser. No. 728,116, filed Sept. 30, 1976, still pending. In the aforementioned application the shape of the electrodes themselves are changed. Tests have shown that this gives an improved output linearity to the arrangement. Another improvement is the subject of U.S. Pat. No. 4,214,152, issued July 22, 1980, in which there is an interdial error correction technique introduced to the circuitry thereof.

Even with these improvements there exist certain problems in the generation and use of the electric field. By "polyphase" it is meant that each signal lags behind its neighbor somewhat. The earlier teachings referenced above have utilized six sine waves separated in phase by 60°. With the sine wave each drive signal rises and falls smoothly as time progresses.

SUMMARY OF THE PRESENT INVENTION

In the present invention it was first theorized that perhaps square waves might be preferable to a smoothly rising and falling sine wave in such an environment for several reasons. First of all, square waves can be generated by considerably simpler circuitry. The phase relationships between the various phases can be more reliably maintained so as to improve the stability, reliability, and sensitivity of the encoder. This is so because the shape of a square wave would be less likely to change with aging of or differences between circuit components. Stronger signals would be obtained from the center electrode since significantly more energy can be supplied to the field from a given power supply with square waves, because a square wave represents the application of maximum available voltage for a longer period than does a sine wave of equal frequency.

Tests have confirmed the theorized preference to the extent that there has been realized approximately 30% reduction in the number of resistors, capacitors, and other components necessary to shape properly the sine wave(s) and in the physical size of the circuit, very significant improvement in stability, and less sensitivity to circuit parameters which are subject to change with age, e.g. values of resistors and capacitors. The increase in signal strength was found to be significantly greater than expected.

In its broadest and most general terms then, the present invention is directed to an improvement in the apparatus disclosed in the earlier Cain et al U.S. Pat. No. 4,007,454 by the changing the input signal from a plurality of smoothly rising and falling sine waves to a plurality of signals each separated from the other by a prescribed phase angle, and each signal being shaped as a square wave.

Such square wave generation can be accomplished according to well-known procedures which include the delivery of the input signal to an oscillator to provide an oscillating signal, followed by the delivery of the oscillating signal to a phase splitter which splits the oscillating signal into a polyphase voltage. The polyphase voltage may be two phase, three phase, or any other number of phases. Three phase voltage is perhaps preferably because it is frequently available from conventional power lines. Therefore the six phases could be the three original phases and their inversions. By driving the signals through squaring amplifiers the sine waves may be reshaped into a square waves and applied to the encoder. In a preferred embodiment, however, the technique for generating the six square wave signals is accomplished digitally in a three stage Johnson counter.

It is therefore among the objects of the present invention to provide an improved transducer for monitoring the angular position of a meter hand or other rotating body as it rotates about an axis of rotation by utilizing the type of encoder generally described in U.S. Pat. No. 4,007,454, except by utilizing a series of square wave input signals.

A further understanding of the invention will become more apparent from reading the following detailed description of a preferred embodiment along with the accompanying drawings in which.

DETAILED DESCRIPTION OF A PREFERRED EMBODIMENT

In general terms, the present invention provides means for producing an electric field in which the resultant vector representing the maximum field strength vector rotates as a set of polyphase voltages is successively (by phase) applied to members of an electrode array with a reading means at the center of rotation of the resultant vector. Other than modifying the shape of the applied polyphase signals from a sine wave shape to a square wave shape the interrogating and comparing circuitry is the same as that disclosed in the Cain et al U.S. Pat. No. 4,007,454 and it is here incorporated by reference. The polyphase square wave signals may be applied to an electrode array that is set forth as described in the Cain et al U.S. Pat. No. 4,007,454, or it may be applied to an array of electrodes as set forth in the Shankle application Ser. No. 728,116, filed Sept. 30, 1976, still pending, the disclosure of which is also incorporated herein by reference.

Figure 1:
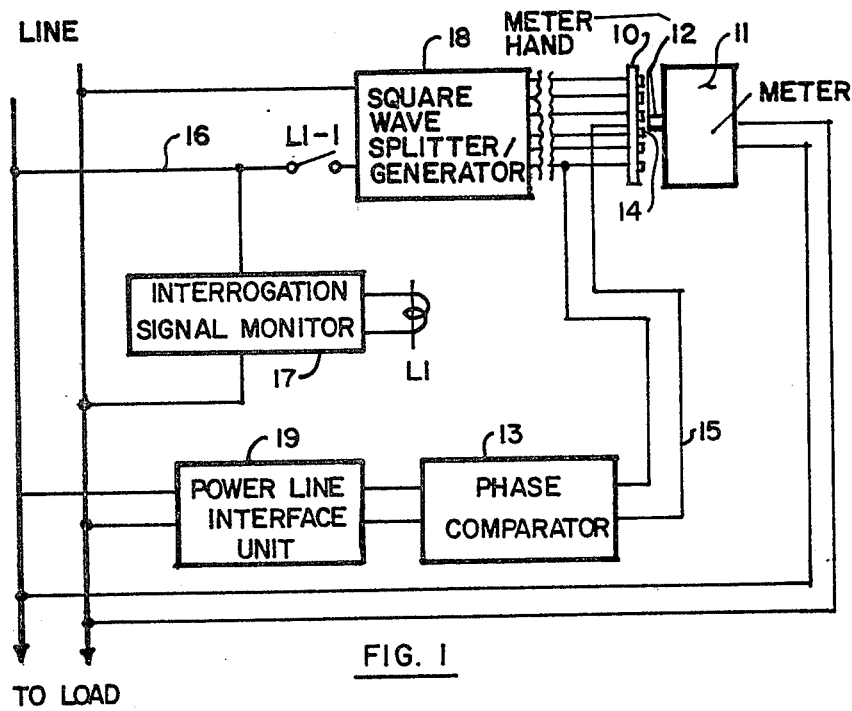
FIG. 1 is a schematic diagram showing a transducer according to the present invention in conjunction with the improved control circuit and a recording circuit therefor.

Referring now to FIG. 1 of the drawings, a transducer generally designated at 10 is positioned adjacent the face of a meter 11 having a hand 12. A reading means 14 in the form of an electrode, or other electric field sensing device is positioned at the center of the transducer 10, the reading means being connected to the line 15 in which there is a phase comparison circuit 13 of conventional and well-known design or by well established digital means, such as a technique in which a digital counter is controlled by a zero crossing detector(s). It is well known that by taking two successive dial readings separated by a known time lapse and looking at the differences of the readings, the speed at which the meter hand is rotating and the direction in which it is rotating can easily be determined. The transducer 10 is also positioned such that the axis of rotation of the resultant vector of the electric field coincides with the axis of rotation of the meter hand 12.

It will be understood that the wire 16 is from a source of electrical voltage, such as single phase, double phase, three phase, or any phase. Generally, however, electric power lines and the like use single phase voltage. A signal monitoring device 17 of conventional design is arranged so as to ignore routine voltage changes occurring on wire 16 but to detect special voltage patterns (which may be superimposed thereon by a remote station and which constitute a request for a meter reading) and respond thereto by closing a switching device such as is represented by relay L1. With this arrangement the relay L1 or other switching device can be remotely energized to activate the transducer 10.

The wire 16 leads to a square wave signal splitter/generator 18 which converts the single or other phase voltage into a plurality of phases, for example, three phases to provide the electric field with the rotating resultant vector. Thus, when it is desired to read meter 11, an interrogation signal is placed on the wire 16 which causes the signal monitor to close the relay contact L1-1. When the contact L1-1 is closed, the single phase voltage through wire 16 will be split by the phase splitter/square wave generator 18 into a polyphase square wave voltage, for example, as illustrated a three-phase voltage. At the same time, as an inherent advantage of the properly connected polyphase voltage, an electric field having the resultant vector thereof representing the maximum field strength vector will be generated to rotate around the face of transducer 10. When the rotating resultant vector crosses, or becomes parallel to, the dial hand 12, a maximum voltage will be induced in the reading means 14. The relative timing of this peak value (maximum voltage) with respect to any reference time is related to the angular position of the hand with respect to a corresponding reference point. It is not necessary that the hand 12 be magnetized, or even electrically conductive, as long as the dielectric constant of the material from which the hand 12 is formed differs significantly from that of the surrounding medium. Generally, any material will work such as metal, ceramic, or plastic.

Figure 2:
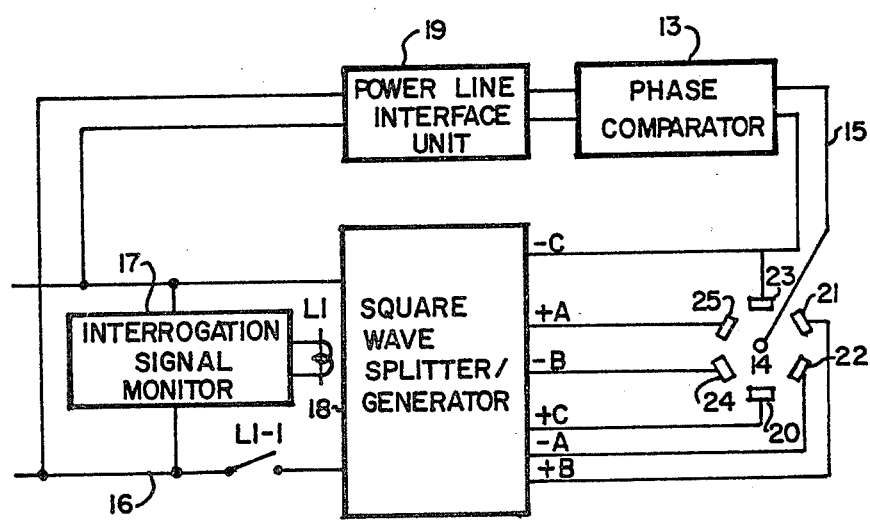
FIG. 2 is a schematic wiring diagram showing the connection of the transducer with the input and reading circuits.
Figure 3:
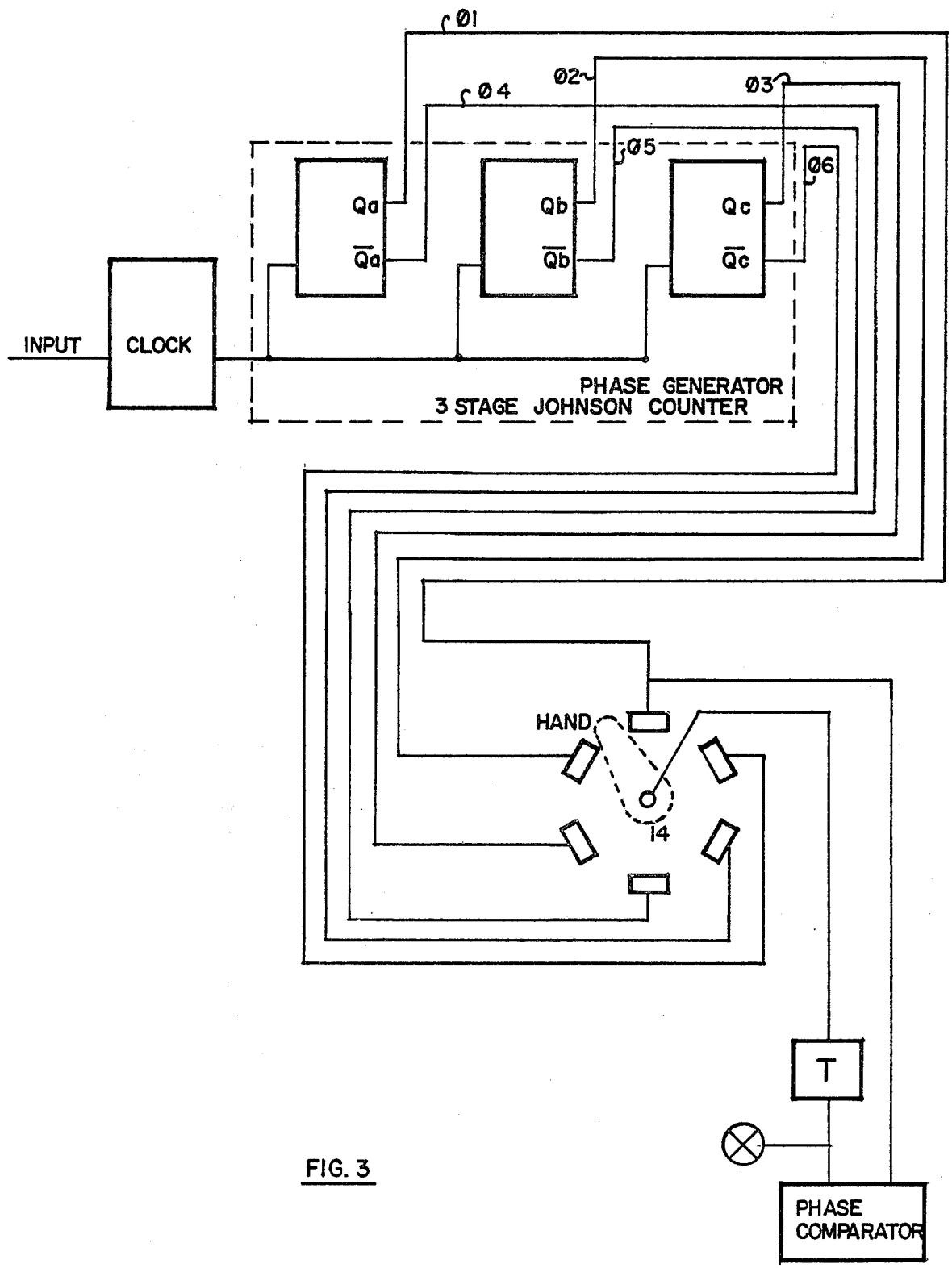
FIG. 3 is an electrical schematic showing a preferred type of square wave generating sub-circuit and filter for use in the present invention.

As illustrated in FIG. 2, it can be seen that the wire 16 is connected through relay contact L1-1 to the phase splitter/square wave generator 18. The details of the phase splitter 18 in its preferred form are illustrated in FIG. 3. In the preferred embodiment of the invention the polyphase square wave signal is generated by a multistage (preferably three stage) Johnson counter. The incoming signal is divided into six square wave outputs that are separated in phase by 60 degrees. It should be understood, however, by those skilled in the art that the phase splitter 18 can provide polyphase voltage, that is voltage of two phase, three phase or any other number of phases. Three phase voltage is perhaps preferable beause three phase voltage will frequently be available from the conventional power line so that the phase splitter 18 will not be required. If three phase voltage were available from the power line, there will be three contacts such as contact L1-1, one of the contacts being in each of the three phase lines, and the phase splitter 18 could be replaced by three phase inverters so that the input to the square wave generator G would consist of the three original phases and their inversions.

In the square wave generator 18 the desired signals could be formed by phase splitting the output of a crystal oscillator, then reshaping the resulting signals by capacitors, resistors, amplifiers and the like to form six outgoing signals, each being a square wave, separated approximately 60° in phase from each other. Each of these polyphase square wave signals could be applied to the transducer 10 in the same manner as disclosed in prior U.S. Pat. No. 4,007,454 which is incorporated herein by reference.

With this arrangement and as illustrated in FIG. 2, it can be seen and understood by those skilled in the art, that when one phase reaches its peak voltage, there will be an electric field between the electrodes 20 and 23, one of the electrodes being positively charged and the other being negatively charged. One hundred twenty (120°) electrical phase degrees later when the phase B reaches it peak voltage there will be a strong electric field between the electrodes 21 and 24, one of the electrodes being positively charged and the other being negatively charged; and the same situation will be true for electrodes 22, 25 when phase A is in the middle of its peak voltage time. Thus, the rotating resultant vector effect is provided.

As far as the reading of the outputs from the transducer 10 by the phase comparator 13 is concerned, there will be a substantial difference than that shown in U.S. Pat. No. 4,007,454. Whereas in the phase comparator of U.S. Pat. No. 4,007,454 a set of sine waves were formed by filtering a plurality of signals, and presenting the plurality of sine waves to the electrodes, the resultant combination summed and compared, now the process is as follows. The set of square waves in the present approach are presented to the electrodes without filtering, the resultant combination of signals is then summed, filtered through a single filter T and compared. Thus only one filter is necessary. Further, the filtering and/or phase determination of the summed output can be achieved through well established digital techniques, such as the technique whereby a digital counter is controlled by a zero crossing detector(s).

While the present invention has been described in detail hereinabove, it is apparent that various changes might be made without departing from the scope of the invention which is set forth in the appended claims.

What is claimed is:

1. An improved apparatus for remotely monitoring the angular position, speed, and/or direction of rotation of a member as it rotates about an axis of rotation and defines a circumferential path comprising:
   (a) means for generating an electric field in which the resultant vector representing maximum field strength rotates in a path parallel to said circumferential path of the rotating member and includes said circumferential path therein;
   (b) a reading electrode means fixedly positioned within said electric field and symmetrically placed with respect to said axis of rotation for sensing a voltage change responsive to the crossing of said rotating member by said resultant vector and emitting an output signal responsive to said voltage change; and
   (c) said means for generating the electric field and said reading electrode both being positioned in confronting, spaced relation to, but in no way otherwise mechanically or electrically connected to said rotating member other than that a portion of said rotating member is within the path of said rotating electric field;
   (d) said means for generating a rotating electric field comprising:
       (i) means for generating a polyphase voltage having a plurality of signals, each separated from the other by a prescribed phase angle, and each signal shaped as a square wave;
       (ii) a plate positioned in spaced, confronting, parallel relation to said circumferential path;
       (iii) a plurality of exciting electrodes defining a circular array around a center point aligned with said axis of rotation of said rotating member, successive electrodes being connected to successive signals of said polyphase voltage.

2. The apparatus according to claim 1 and further including a filter device electrically downstream of said reading electrode and a phase comparing means electrically downstream of said filter device for determining the resultant phase angle which corresponds to the position of said rotating member.

* * * * *